Jan. 16, 1934.    A. E. DOMAN ET AL    1,943,656
THERMOSTATIC HEAT REGULATOR
Filed July 2, 1931    3 Sheets-Sheet 2
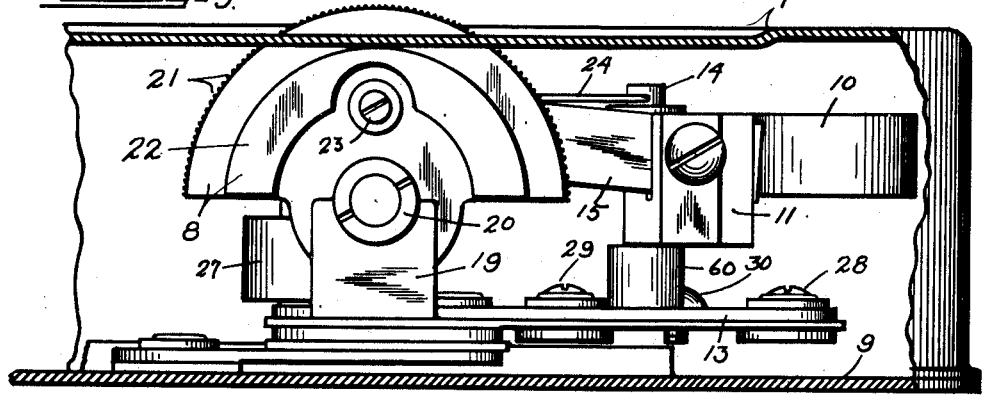
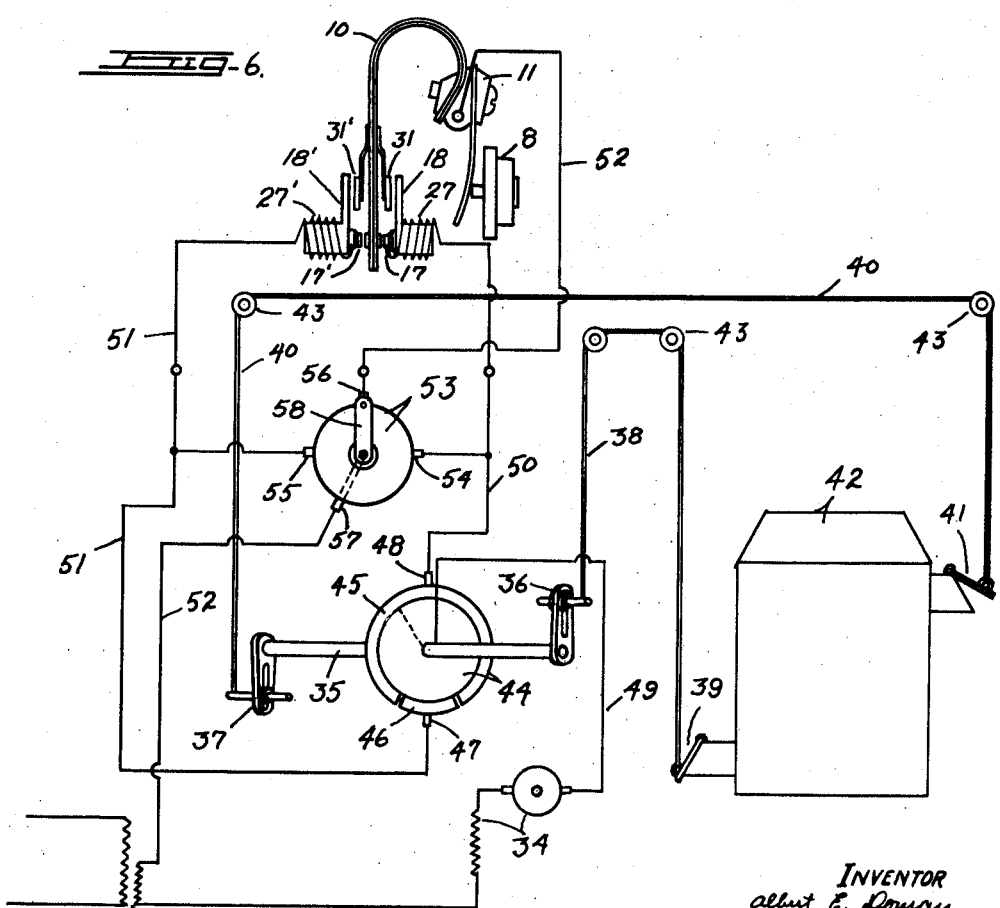

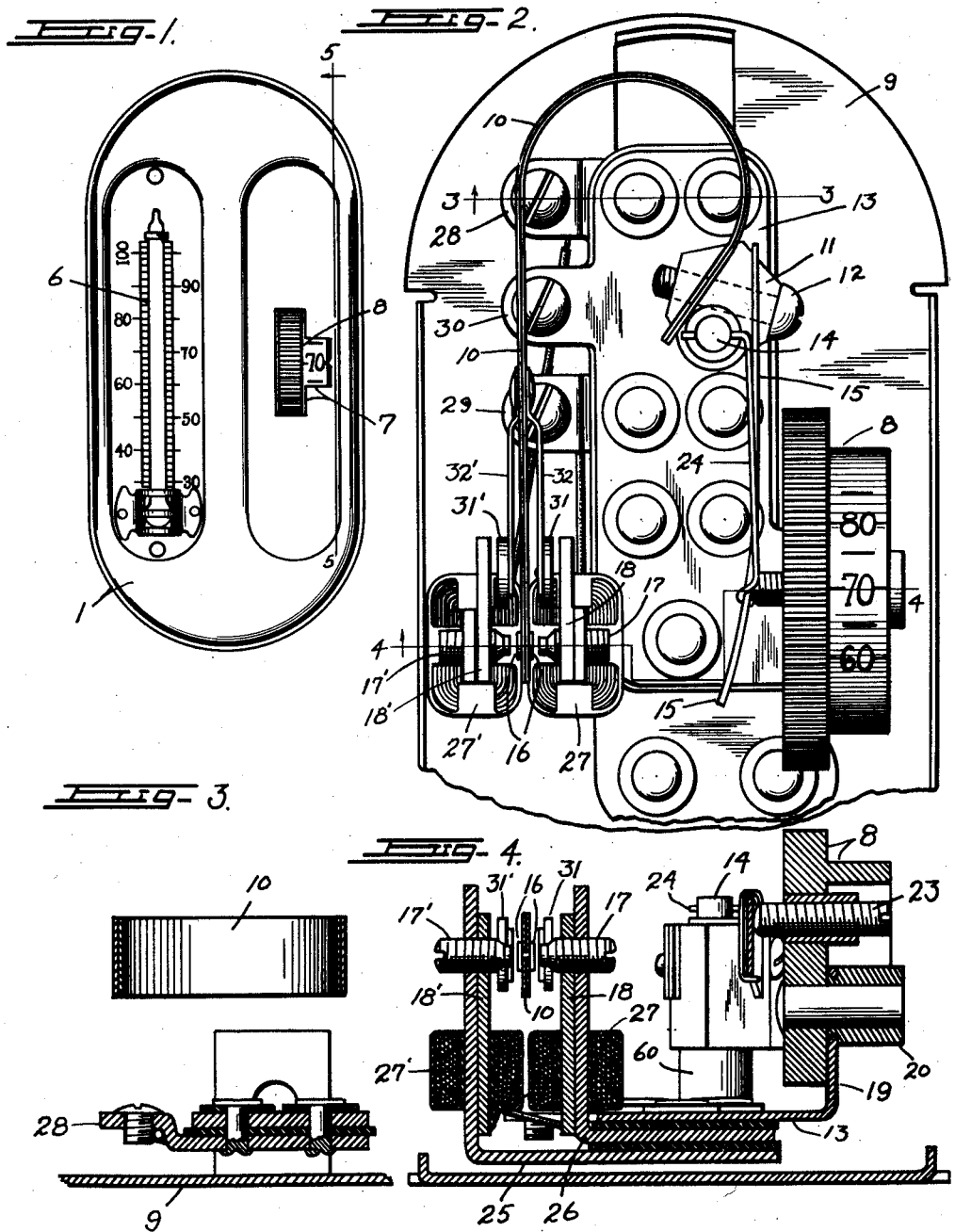

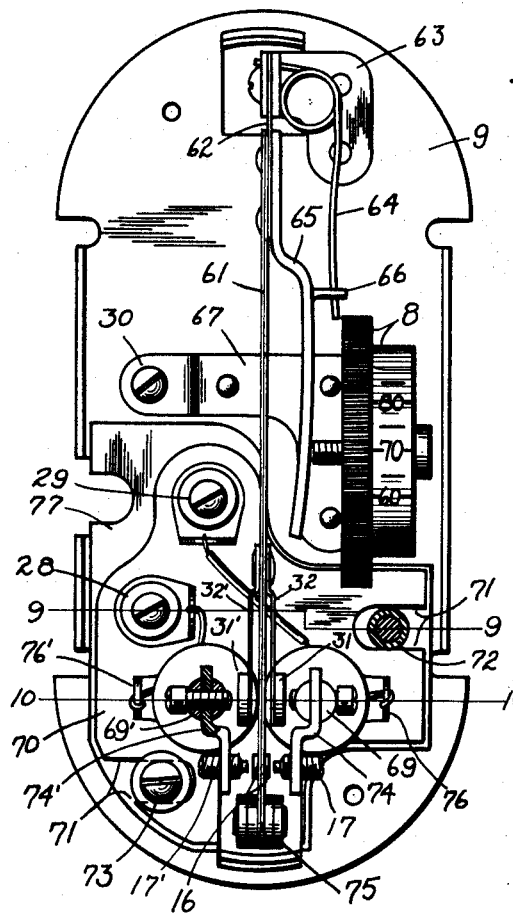
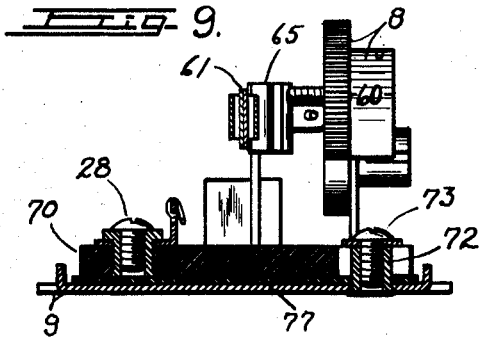
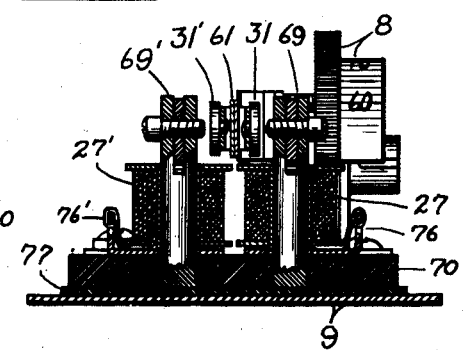
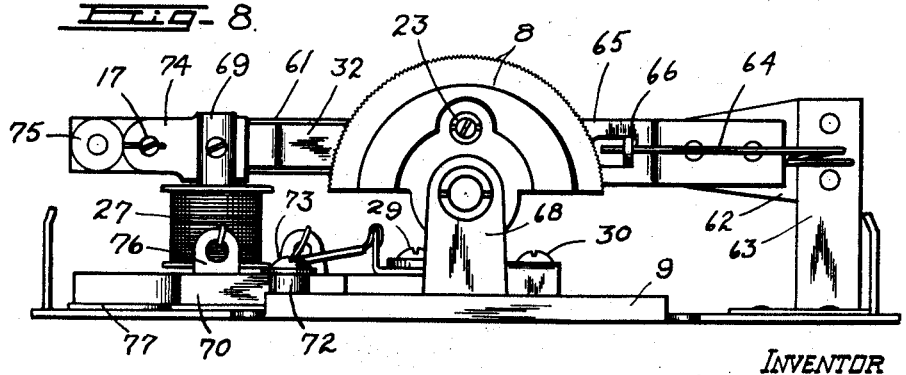

Patented Jan. 16, 1934

1,943,656

UNITED STATES PATENT OFFICE 1,943,656

THERMOSTATIC HEAT REGULATOR

Albert E. Doman, Elbridge, and Kenneth H. Bowen and Frederick H. Gleason, Auburn, N. Y., assignors to Bowen Products Corporation, Auburn, N. Y., a corporation of New York Application July 2, 1931. Serial No. 548,394

14 Claims. (Cl. 200—139)

This invention relates to improvements in thermostatic heat regulators and particularly to improvements in thermostatic control element.

Thermostatic heat regulators generally cover a broad field. Heat control for the heating of buildings is generally limited to the regulation of the drafts of the heating plant in order to maintain a pre-determined temperature. Draft operation may be accomplished in a number of ways as, for instance, by means of mechanical motors, either spring or weight driven or by electrical motors. In either case a thermostatic element is employed in controlling the motor.

In the case of an electric motor draft-operating device, the thermostatic element is usually connected directly in the motor circuit. The motor may be operated from either direct or alternating current. However, the alternating current source is more desirable as any convenient 110 volt lighting circuit outlet may be used as a source of power.

The thermostatic control element is of major importance in any automatic heat regulating system, especially if alternating current is used to drive the draft-operating motor. Difficulty is experienced in preventing arcing at the thermostatic contact points which, in a short period of time, will make the element inoperative.

It is, therefore, an object of this invention to provide a thermostatic element with contact points adapted for operation on alternating current.

Another object of this invention is to provide a thermostatic element that is rugged and is easily set to operate at a pre-determined temperature.

A further object of this invention is to provide a thermostatic control element that may be easily and quickly adjusted.

Other objects and advantages relate to details of the structure and will be apparent from the following description, taken in connection with the accompanying drawings, in which:—

Figure 1 is a plan view of the thermostatic control element with the outer cover in place.

Figure 2 is a plan view of the thermostatic control element with the cover removed.

Figure 3 is a sectional view taken along line 3—3 of Figure 2.

Figure 4 is a sectional view taken along line 4—4 of Figure 2.

Figure 5 is a sectional view taken along line 5—5 of Figure 1.

Figure 6 is a diagrammatic view of a complete heat control system.

Figure 7 is a plan view of a modified thermostatic control element with its cover removed.

Figure 8 is a side elevational view of the thermostatic control element of Figure 7.

Figure 9 is a sectional view taken along line 9—9 of Figure 7.

Figure 10 is a sectional view taken along line 10—10 of Figure 7.

The thermostatic control element is shown in Figure 1 housed in a metal casing 1. The front side of this casing may be provided with a thermometer 6 as illustrated. A T-shaped aperture 7 is provided in casing 1 to permit the thermostat setting control 8 to protrude through the casing and to make the temperature scale on the drum of the control visible.

The thermostatic control element is shown to a better advantage in Figure 2 and the sectional views of Figures 3 to 5. A base plate 9, in this instance, provides means for mounting the thermostat element 10 and its associated electrical contact switch mechanism. Thermostat element 10 is preferably formed with a loop at one end so as to insure greater sensitivity. The looped end is fastened to a block 11 pivotally mounted on supporting plate 13. The mounting may be effected by a pin 14 journaled in a block 11 and secured to plate 13. A collar 60 provides spacing means for positioning the thermostat element with respect to plate 13. A cam lever 15 is also fastened to block 11 for producing pivotal movement of the block which effects the thermostat setting.

Plate 13 includes an extension 19 turned up at right angles and provided with a bearing 20 in which is journaled the thermostat indicator 8. This indicator is semi-circular in form and resembles the drum control indicator of a radio receiver.

A serrated portion 21 of indicator 8 projects through aperture 7 of cover 1 when the latter is in place and thereby provides means for rotating the indicator. The drum portion 22 is provided with a temperature index ranging from sixty to eighty-five degrees. This index is also visible through aperture 7 of cover 1. A screw 23 is threaded into indicator 8 and extends therethrough, contacting with cam lever 15.

A spring member 24 having one end fastened to pin 14 and the other engaging cam lever 15 maintains the latter in constant engagement with screw 23. It can be readily seen that the thermostat element 10 may be made to pivot about pin 14 by rotating indicator 8 or by screwing the screw 23 in or out. Screw 23 also provides means for adjusting the thermostat, and will be more fully explained later.

The free end of thermostat element 10 is provided on both sides with contacts 16 and is positioned between two pole pieces 18 and 18'. These pole pieces may be mounted on angle members 25 and 26 respectively insulated from each other and from the base 9 as shown. Into pole pieces 18 and 18' are threaded adjustable contacts 17 and 17' adapted to contact alternately with contacts 16 on thermostat element 10.

Each pole piece is made with a magnetizing coil 27 and 27', one end of the winding, in each case, being connected to the pole piece and consequently to the adjustable contacts 17 and 17'. The other ends of the coils are respectively connected to terminals 28 and 29. These terminals provide for external connections and are mounted on plate 13 but insulated therefrom. Plate 13 is also insulatingly mounted on base 9 and is provided with a terminal 30 in electrical contact therewith which makes an external connection possible through the terminal to thermostat element 10. As the thermostat element 10 deflects, due to temperature changes, contacts 16 will contact with either contact 17 or 17' completing the electrical connection from terminal 30 through element 10, either of the coils 27 or 27' and to either terminal 28 or 29, as the case may be, depending upon the direction of deflection of the element.

External control circuits may then be operated through the three terminals 28, 29 and 30. The use of alternating current, however, produces excessive vibration in thermostat element 10 and arcing between contacts 16, 17 and 17' which soon pits and corrodes the contact surfaces. In order to make a more firm and quick-acting contact, the thermostat element 10 has been provided with armatures 31 and 31' flexibly mounted on bronze springs 32 and 32' secured to both sides of the element.

Armatures 31 and 31' are positioned so as to be in the magnetic field of pole pieces 18 and 18'. The action of these armatures will appear more fully in connection with the description of the operating system.

The operation of the thermostatic control element can best be described in connection with the schematic illustration of Figure 6 in which a furnace 42 is shown equipped for automatic heat control. A step-down transformer 33 may be employed to provide alternating current power from any suitable lighting current outlet for the operation of the draft control motor.

In circuit with the secondary of transformer 33 is an electric motor 34, here illustrated as a motor of the series type. The armature of motor 34 is preferably coupled by means of a speed-reducing gear train to a draft-operating crank shaft 35. Crank arms 36 and 37 are mounted on the ends of shaft 35 in opposed relation. In this instance, crank arm 36 is connected by a chain 38 or other suitable means, to draft damper 39 and crank arm 37 is connected by chain 40 to check damper 41. Pulleys 43 provide the usual chain-supporting means employed in conventional damper control.

In the drawings, crank arms 36 and 37 are shown in a position for closed draft and open check. A commutator 44 having two segments 45 and 46, is mounted on shaft 35. Segment 45 subtends substantially a three hundred degree arc and is grounded to shaft 35 while segment 46 is insulated from the shaft and subtends a smaller arc, in this instance, substantially sixty degrees.

Diametrically opposed and in contact with commutator 44 are two brushes 47 and 48. Shaft 35 is electrically connected to one of the motor terminals as indicated by connecting wire 49. Brush 48 is connected by means of conductor 50 to coil 27 which terminates at contact 17. Brush 47 is connected by means of conductor 51 to coil 27' which terminates at contact 17'. Thermostat element 10 is connected electrically from block 11 through conductor 52, through control switch 53 to one side of the secondary winding of transformer 33. Control switch 53 has three contact positions. In the diagram, contact arm 58 is shown contacting with terminal 56 or is in a position for automatic operation of the system.

In describing the operation of the device, we will assume that thermostat indicator 8 is set at the desired room temperature. Thermostat element 10 is midway between contacts 17 and 17' or, in other words, the electrical circuit of motor 34 is broken. The furnace dampers are in a position of closed draft and open check. Then, as the temperature in the room is lowered, thermostat element 10 deflects to the right closing the motor circuit through contact 17, coil 27, conductor 50, brush 48 and conductor 49 to one motor terminal.

Thermostat element 10 will always be considered in circuit with the other motor terminal during the discussion of automatic operation. Motor 34 will cause shaft 35 to rotate until segment 46 which is insulated from shaft 35, comes in contact with brush 48. As soon as brush 48 contacts segment 46, the motor power circuit is opened and the motor stops. During the time the motor was in operation, shaft 35 has been rotated one-half revolution. Crank arms 36 and 37 have been reversed causing draft damper 39 to be opened and check damper 41 to be closed. The dampers will remain in this position until the increase in heat from the furnace is sufficient to deflect thermostat element 10 to the left, which again starts the motor but through circuit by way of coil 17', conductor 51 and brush 47 which is now contacting segment 45. The motor will again come to rest as segment 46 comes in contact with brush 47. The operation is identical in both cases.

The use of alternating current for motor operation as has been previously pointed out, causes the thermostat element 10 to vibrate, and pitting and corrosion of the contact points results.

A novel feature of our device is found in a positive thermostat contacting device. Let us assume that the thermostat element deflects to the right just sufficiently to lightly contact with contact 17. Coil 27 will be energized, magnetizing pole piece 18 which attracts armature 31. Since armature 31 is spring-mounted on thermostat element 10, the latter will be positively held in contact with contact 17. Alternating flux variations in the magnetic circuit will not produce appreciable thermostat element vibration as the spring support member 32 substantially absorbs the mechanical impulses. It is readily seen that the spring-mounted armature construction provides quick and positive thermostat operation and greatly increases the useful life of the contact points. Considerable latitude may be allowed in the structural features controlling the extent of movement of armatures 31 and 31' with respect to pole pieces 18 and 18'. It will be apparent from the foregoing description that it is of minor importance if the armatures are permitted to contact with their respective pole pieces while in the holding position since the thermostatic device is not required to break the control circuit at a time when the circuit is energized. Should contact be permitted, no arcing would occur when the armature breaks away from its pole piece since the circuit is interrupted by commutator 44 prior to the separation of either the contacts 16 and 17 or armatures 31 and 31' from their respective pole pieces 18 and 18'. It will, however, be apparent that in the event one desires to utilize the thermostatic control device for breaking a circuit under load, armatures 31 and 31' may be insulated from pole pieces 18 and 18' in any well known manner as by limiting the extent of movement thereof so that an air gap remains therebetween or by utilizing insulating material on either the armatures or pole pieces or even by insulatingly mounting the armatures on the thermostatic bar.

In addition to automatic operation, switch 53 provides means for manually causing the motor to open and close the dampers as desired. Contact 54 is connected to line 50 while contact 55 is connected to line 51. If it is desired to have the draft damper open and the check damper closed, contact arm 58 would be made to engage with connection 54. The motor circuit will be completed through switch 53 which merely shunts the thermostat control device. Placing contact arm 58 in engagement with connection 55 will reverse the draft position in a similar manner as previously described.

The thermostatic control element, as previously mentioned, embodies a novel adjusting feature. By pivotally mounting the thermostat element a spring-pressed cam and lever mechanism may be employed for setting the thermostat to operate at different temperatures.

In order to adjust the thermostat, it is only necessary to set indicator 8 to the corresponding temperature of the room or to the temperature as indicated by thermometer 6. Adjusting screw 23 may then be screwed in or out until the free end of thermostat element 10 is midway between contact points 17 and 17'. The index scale or drum 22 is calibrated in accordance with the amount of thermostat deflection for given temperature changes. The particular curvature of cam lever 15 will also affect the calibration of the indicator.

A modified thermostatic control element is illustrated in Figures 7 to 10 and possesses numerous structural advantages. Identical parts will be designated by the same reference numbers as used in the previous figures, while modified parts will be given new reference figures.

In this instance, thermostat element 61 is in the form of a straight blade secured at one end to a spring member 62 which, in turn, may be secured to an angle member 63 mounted on base plate 9. Indicator 8 may be journaled, as previously described, in angular extension 68 of bracket 67 which also is mounted on base plate 9. Indicator 8 is also provided with an adjusting screw 23.

Cam lever 65 may be mounted on thermostat element 61 as shown, and be held in constant engagement with screw 23 by means of a spring 64 having one end positioned in an aperture through angle member 63 and its other end passing through an aperture in a projecting tongue 66 of cam lever 65.

Pole pieces 69 and 69' provided with magnetizing coils 27 and 27' may be molded into an insulating base member 70 which is preferably adjustably mounted on base plate 9. Lateral adjustment of insulating member 70 is provided by means of slots 71 slidably engaging bosses 72 mounted on base plate 9. Screws 73 threaded into bosses 72 provide means for firmly holding insulating member 70 in the desired position.

In Figure 7, one of the screws 73 is shown in cross section to more clearly illustrate the construction. Pole pieces 69 and 69' are also provided with brackets 74 and 74' which respectively provide supports for adjustable contacts 17 and 17'. Contacts 16 are provided on thermostat element 61 so as to be in alignment with contacts 17 and 17'.

Armatures 31 and 31' mounted by means of bronze springs 32 and 32' on thermostat element 61 are positioned between pole pieces 69 and 69' so as to be within the magnetic field thereof for reasons previously mentioned.

Field coils 27 and 27' are electrically connected at one end to terminals 76 and 76' which contact respectively with pole pieces 69 and 69', and incidentally, with contacts 17 and 17'. The other ends of coils 27 and 27' are connected respectively to terminals 29 and 28, as shown. Terminals 28 and 29 may be molded into insulating member 70, as illustrated. External electrical connections are made by means of the above-mentioned terminals 28 and 29 and by terminal 30 which is formed by an angular extension of bracket 67.

Insulating sheet 77 provides perfect insulation of all metal parts imbedded in insulating member 70 from base plate 9. The modified thermostat element 61 is provided with a concentrated mass at its free end, in this instance, illustrated as a plurality of washers 75 secured to both sides of the blade. The increase in mass of the element at this point greatly adds to the stability of the element during operation and aids the spring-supported armatures 31 and 31' in preventing vibration caused by the alternating magnetic pulsations.

Arcing, which causes corrosion and pitting of the electrodes, is thereby substantially eliminated.

The operation of the modified form of thermostatic control element is identical with that of the element previously described in connection with Figure 6. The modified form, however, is thought to have some advantages in that the inertia of the thermostat element has been increased so that it is not so susceptible to vibration. The element is also somewhat more sensitive due to the spring mounting, as compared with the pivotal pin mounting. Adjustment of the contact points is also facilitated in that the insulating base supporting the field poles and contacts is made laterally adjustable.

Ease in adjustment of the control device will be clearly seen from the following descriptive procedure. First, indicator 8 is set at the room temperature, as indicated by the thermometer on the face of the thermostat control element cover. Contacts 17 and 17' may be screwed in or out until the proper spacing is obtained. Clamping screws 73 are loosened allowing insulating base member 70 to be shifted laterally until contacts 16 of thermostat element 61 are centered between contacts 17 and 17'. Clamping screws 73 may then be tightened holding base member 70 securely in place. In the event that lateral adjustment of member 70 is limited, auxiliary adjustment for centering thermostat element 61 may be obtained by adjusting screw 23 of indicator 8 in or out as the case may demand.

Although we have shown and described a specific embodiment of our invention, it is to be understood that it was merely for illustrative purposes, and that thermostatic elements embodying our novel features may be used for purposes other than those described, without departing from the spirit and scope of the appended claims.

We claim:

1. In a thermostatic control device, a pair of spaced electrical contacts, a thermostat element pivotally mounted at one end and having its other end positioned between said contacts, electromagnetic means associated with said contacts, magnetic means associated with said element adapted to operate in conjunction with said electromagnetic means for selectively increasing the contact pressure between said element and either of said contacts, means for adjusting the position of said element with respect to said contacts, and means for setting the position of said element to contact with either of said contacts at a predetermined temperature, said means comprising a cam mounted on said element, and an indicator having an adjustable member in contact with said cam, said cam and said indicator being so positioned that rotation of the indicator imparts motion to said element.

2. In a thermostatic control device, a pair of spaced magnetic field poles having field coils thereon, a pair of spaced electrical contacts in circuit with said coils and adjustably mounted in said field poles, a thermostat element mounted at one end and having its free end positioned between said contacts, a pair of armatures resiliently mounted on said element and positioned on opposite sides thereof between said field poles.

3. In a thermostatic control device, a pair of spaced magnetic field poles having field coils thereon, a pair of spaced electrical contacts in circuit with said coils and adjustably mounted in said field poles, a thermostat element mounted at one end and having its free end positioned between said contacts, a pair of armatures resiliently mounted on said element and positioned on opposite sides thereof between said field poles, and means for setting the position of said element with respect to said contacts.

4. A thermostatic control device comprising a pair of spaced electrical contacts, a thermostatic element having one end disposed between said contacts, means for mounting the opposite end of said element, a pair of electro-magnets disposed upon opposite sides of said element, a pair of armatures disposed upon opposite sides of said element and positioned adjacent respective electro-magnets, and spring members securing the armatures to said element.

5. In a thermostatic control device, a pair of spaced magnetic field poles having field coils thereon, a pair of spaced electrical contacts in circuit with said coils and adjustably mounted on said field poles, a thermostatic element having a concentrated mass at one end disposed between said contacts near said mass, and a member for flexibly supporting the other end of said element.

6. In a thermostatic control device, a pair of spaced magnetic field poles having field coils thereon, a pair of spaced electrical contacts in circuit with said coils and adjustably mounted on said field poles, a thermostatic element having a concentrated mass at one end disposed between said contacts near said mass, a member for flexibly supporting the other end of said element, and means for adjusting the position of said element with respect to said contacts.

7. In a thermostatic control device, a pair of spaced magnetic field poles having field coils thereon, a pair of spaced electrical contacts in circuit with said coils and adjustably mounted on said field poles, a thermostatic element having a concentrated mass at one end disposed between said contacts near said mass, a member for flexibly supporting the other end of said element, a pair of armatures disposed on opposite sides of said element and positioned adjacent said magnetic field poles, and spring members securing the armatures to said element.

8. In a thermostatic control device, a pair of spaced magnetic field poles having field coils thereon, a pair of spaced electrical contacts in circuit with said coils and adjustably mounted on said field poles, a thermostatic element having a concentrated mass at one end disposed between said contacts near said mass, and a member for flexibly supporting the other end of said element, a pair of armatures disposed on opposite sides of said element and positioned adjacent said magnetic field poles, spring members securing the armatures to said element, and means for adjusting the position of said element with respect to said contacts.

9. A thermostatic control device comprising a pair of spaced electrical contacts, a thermostatic element having a concentrated mass at one end and disposed between said contacts near said mass, a supporting member flexibly mounting the opposite end of said element, and means for rocking said element about its support.

10. A thermostatic control device comprising a pair of spaced electrical contacts, a thermostatic element having a concentrated mass at one end and disposed between said contacts near said mass, a supporting member flexibly mounting the opposite end of said element, a cam device connected to said element, and means adapted to engage the cam device to move said element about its support.

11. A thermostatic control device comprising a pair of spaced electrical contacts, a thermostatic element having a concentrated mass at one end and disposed between said contacts near said mass, a supporting member flexibly mounting the opposite end of said element, a movable dial having temperature indicia thereon, and means actuated by movement of said dial for moving said element about its support.

12. A thermostatic control device comprising a pair of spaced electrical contacts, a thermostatic element having a concentrated mass at one end and disposed between said contacts near said mass, a supporting member flexibly mounting the opposite end of said element, a movable dial having temperature indicia thereon, means actuated by movement of said dial for moving said element about its support, and additional means for regulating the extent of such movement.

13. A thermostatic control device comprising a pair of spaced electrical contacts, a thermostatic element having a concentrated mass at one end and disposed between said contacts near said mass, means for mounting the opposite end of said element, and means for simultaneously adjusting the position of said contacts with respect to the position of said element.

14. A thermostatic control device comprising a pair of spaced electrical contacts, a thermostatic element having a concentrated mass at one end and disposed between said contacts near said mass, means for mounting the opposite end of said element, means for simultaneously adjusting the position of said contacts with respect to the position of said element, a pair of electro-magnets disposed upon opposite sides of said element, a pair of armatures disposed upon opposite sides of said element and positioned adjacent respective electro-magnets, and spring members securing the armatures to said element.

ALBERT E. DOMAN.
KENNETH H. BOWEN.
FREDERICK H. GLEASON.